July 23, 1957 C. S. ALLEN Re. 24,338

PLASTIC SPOUT FOR LIQUID CONTAINERS

Original Filed Feb. 9, 1950 3 Sheets-Sheet 1

INVENTOR.
CHESTER S. ALLEN
BY
Archibald R. McCallum
ATTORNEY

PLASTIC SPOUT FOR LIQUID CONTAINERS

Original Filed Feb. 9, 1950 3 Sheets-Sheet 2

*INVENTOR.*
CHESTER S. ALLEN
*BY* Archibald R. McBellum
ATTORNEY

PLASTIC SPOUT FOR LIQUID CONTAINERS

Original Filed Feb. 9, 1950 3 Sheets-Sheet 3

INVENTOR.
CHESTER S. ALLEN
BY Archibald R. MacCallum
ATTORNEY

United States Patent Office

Re. 24,338
Reissued July 23, 1957

24,338

PLASTIC SPOUT FOR LIQUID CONTAINERS

Chester S. Allen, Warren, Pa., assignor to West Penn Closure Corporation, Warren, Pa., a corporation of Delaware Original No. 2,670,885, dated March 2, 1954, Serial No. 143,230, February 9, 1950. Application for reissue February 20, 1956, Serial No. 566,752

11 Claims. (Cl. 222—569)

Matter enclosed in heavy brackets [ ] appears in the original patent but forms no part of this reissue specification; matter printed in italics indicates the additions made by reissue.

This invention relates to closures and in particular to closures for containers of volatile fluid such as lighter liquid and spot remover.

It has been a practice heretofore to supply such volatile fluids in a type of small metal container containing four fluid ounces having an apertured flat top and an upstanding metal neck with an external circumferential groove. The groove is designed to receive the metal depending skirt of a spout type metal closure element, the closure applying operation being accomplished, for example, by a so-called Callahan capping machine, which squeezed the closure skirt circumferentially and caused the metal of the skirt to press or flow into and fill the external groove of the can neck. This operation would frequently produce a satisfactory hermetical seal between the spout skirt and the can neck, but due to the rigidity and inherent lack of resilience in the parts constituting this metal to metal seal, subsequent vibration or jolting in normal shipping or handling too frequently disrupted the sealing connection and thus permitted the inflammable fluid contents of the can to escape. The hazards of this conventional closure became well-known and damage experience became sufficiently important as to create serious insurance, safety and indemnity problems.

This art of closures for fluid containers is characterized by large volume and small unit value, hence solution of the fundamental problem, that is, how to maintain the durable and effective seal between spout skirt and can neck, necessarily was accomplished within narrow cost limits for material, labor and equipment and, of course, the ideal solution would be eliminating the difficulties in such manner as to enable the use of pre-existent equipment.

It is therefore an object of the present invention speedily and economically to provide a tight and durable seal between can and spout.

It is another object of the invention to provide a plastic spout to fit around the outside of the can neck.

It is another object of the invention to provide a plastic cap for the plastic spout which will provide an efficient closure for the spout after the latter has been opened.

It is another object of the invention to provide a plastic spout with a lengthened skirt to facilitate the capping operation.

It is another object of the invention to provide a plastic spout design which may be made up in colors corresponding to or contrasting with the colors of the can.

It is another object of the invention to provide a closure element for containers of inflammable fluids comprising plural plastic elements which may be similarly or differentially colored, respectively.

It is also an object of the invention to provide a spout design which will prevent leakage without requiring modification of the standard can neck and is adapted for convenient use in the conventional Callahan capping machines and other machines of standard type and practice.

The above and further objects of the invention will be understood by referring to the following detailed description read in connection with the accompanying drawings wherein Fig. 1 is a fragmentary exploded view showing the can and completed closure, with the plastic spout cap;

Figure 1:
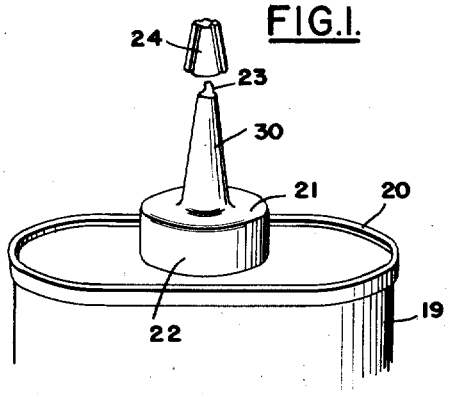

Referring to the drawings wherein identical parts are indicated by similar reference numerals, the metal can 19 for lighter fluid or spot remover has a metal top 20 surmounted by a plastic spout or cap 21 constituting an important aspect of the invention. Spout 21 has a base 22 and upwardly a finish lobe 23 formed in the molding process. The finish lobe 23 is formed integrally with the spot 21 and is abruptly reduced in section at the junction thereof with the spout 21 for facilitating the severance of the finish lobe from the plastic spout. It will be understood that the finish lobe is readily separable by a knife or with the fingernail when it is desired to open the container sealed in the practice of this invention. A plastic cap 24 surmounts the spout and protects lobe 23 before opening and seals the spout against accidental spillage or leaking after opening.

Figure 2:
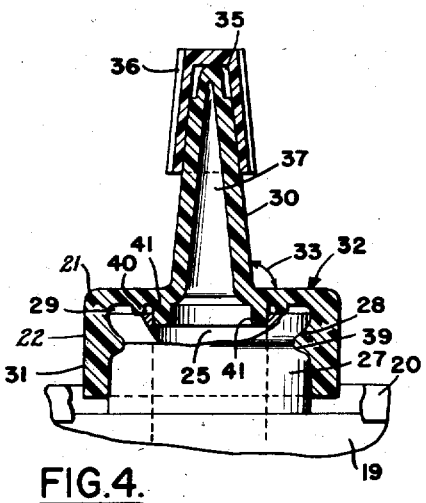
Fig. 2 shows an enlarged vertical section of the can spout and spout cap after assembly and before opening.

The details of construction of the present cap are particularly shown in Fig. 2 wherein top 20 of can 19 has the usual aperture 25 communicating with upstanding neck 27 the latter having a circumferential groove forming an upper annulus 29. *Pouring spout* [spout] 30 is preferably made of colored plastic of such a composition that it is flexible, proof against deterioration or dissolution by volatile or corrosive liquids and possessed of a greasy surface feel, the latter being of particular interest in that it facilitates the placing of the spout on the neck to seal the can as hereinafter described.

Spout 30 *is connected to* [has] a skirt 31 depending from base 22, such skirt, it being important to note, is at least one-sixteenth of an inch longer than previous spouts, the purpose of this additional length being to aid in uniting the cap and the neck. The skirt provides additional material so that the operator may place the spout on the neck of the can prior to subjecting it to the capping machine and the spout-mounted can may then move along the assembly line or link belt without being accidentally dislodged. The purpose of providing the additional length on the skirt 31 at least 1/16 of an inch longer than previous spouts is to insure, by the resilient nature of the plastic material forming the spout, a snug engagement about the neck of the container below the sealing ring *or bead* 39. That is to say, if the sealing ring 39 has moved to a position engaging beneath the beaded neck of the container the cylindrical skirt extends a sufficient distance to establish a snug contact with the smooth exterior wall of the neck. Thus the resilient interior surface of the cylindrical part of the neck serves initially to position the spout on the neck of the container while the container is being moved along the assembly line as part of the process in applying the spout to the container, and thereafter the resilient interior wall serves to grip and maintain the spout in fixed position on the neck with the triple seal effected between sealing ring *or bead* 39 and the exterior of the neck of the container; between the sealing *annular member or* shoulder 40 and the top of the neck of the container; and the seal effected between the resilient ring *member* 41 and the interior of the neck of the container. The fact that the plastic material from which the spout is formed is resilient in nature insures yieldability of the sealing porion sufficiently to effect a dependable fluid tight closure. The relatively short skirt of conventional spouts is wholly inadequate for effecting the type of seal accomplished in the closure of my invention. Moreover, a spout formed from metal, such as lead, does not possess the quality of resiliency possessed by the plastic material from which the spout of my invention is formed, so that such metallic or lead spouts have necessitated additional operations thereon for effecting a seal. Such operations are unnecessary in applying the plastic spout of my invention.

Referring again to Fig. 2, [spout 30] *cap 21* has a flat top or upper surface 32 which is useful in applying the cap to the neck during the closure operation.

Angle 33 between tapering spout 30 and flat top 32 may, of course, be arbitrary within limits of the art but its relation to angle 35 determining the inclination of the sides of cap 24 must be such that the inner wall of cap 24 when inserted firmly on the spout 30 will tend to bind thereto and thus prevent leakage after the spout has been opened as in use. For example, angle 33 may be 100° and angle 35 may be 95°.

Externally the plastic cap 24 has vertical grooves which strengthen the structure, impart a pleasing ornamental appearance thereto and aid in the molding process and the means of plastic injection which may be used in manufacture of cap 24.

The spout 30 is provided with a continuous recess *or fluid passageway* 37 extending axially thereof. At the bottom the spout *skirt* 31 is preformed to have an internal integral annular sealing ring 39 for snugly connecting in groove 28 in neck 27. In this assembly inherent possibility of dislocation or breaking of the seal by vibration or accident is very slight due to the resilient nature of the plastic material employed in forming of *cap 21 and* spout 30, and due to the particular construction of the cooperating parts as illustrated. Top 32 of the spout is provided on its undersurface with a supplementary *annular* sealing *ring or* shoulder 40 which closely engages the top of the neck 27 and concentrically with an inner and longer supplementary sealing shoulder 41 which extends into the neck aperture to provide a third sealing agent.

It will be apparent from the above that the space relation between preformed sealing ring *or bead* 39 and the concentric and cooperating supplemetary rings 40 and 41 must be such that the fitting of sealing ring *or bead* 39 into groove 28 of the *container* neck pulls the supplementary sealing rings under tension to bear closely upon the respective adjacent portions of the neck structure. From the foregoing it will be apparent that spilling is prevented by ring 41 which prevents the fluid from emerging from the neck. Any slight amount to escape is prevented from flowing over the top of the neck by ring 40, and a final hermetical seal is provided externally of the neck by the intimate placement of plastic sealing ring *or bead* 39 in metal groove 28.

The invention described not only provides a perfect seal to protect against subsequent leakage, damage and indemnity problems but the structure is so designed as to be economical and conveniently attachable by conventional mechanisms, or manually.

Figure 3:
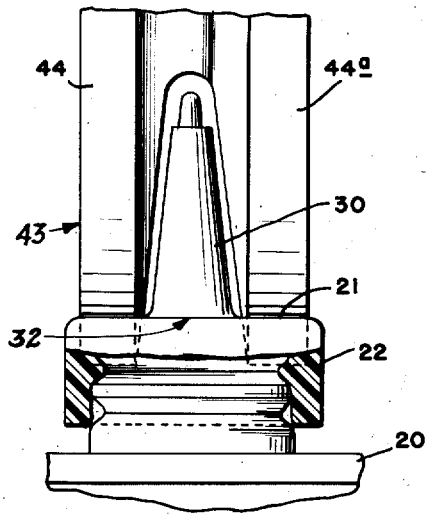
Fig. 3 shows the spout approaching the capping machine.
Figure 4:
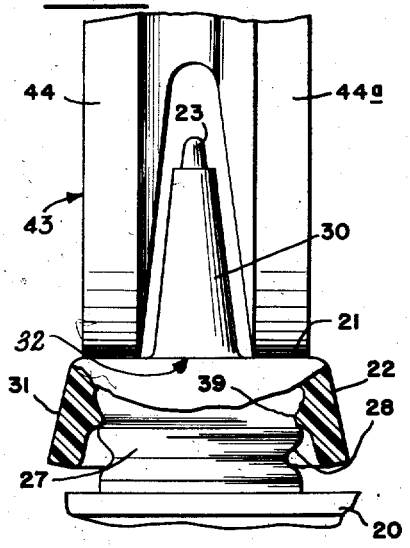
Fig. 4 shows the action of the capping machine on the spout.
Figure 5:
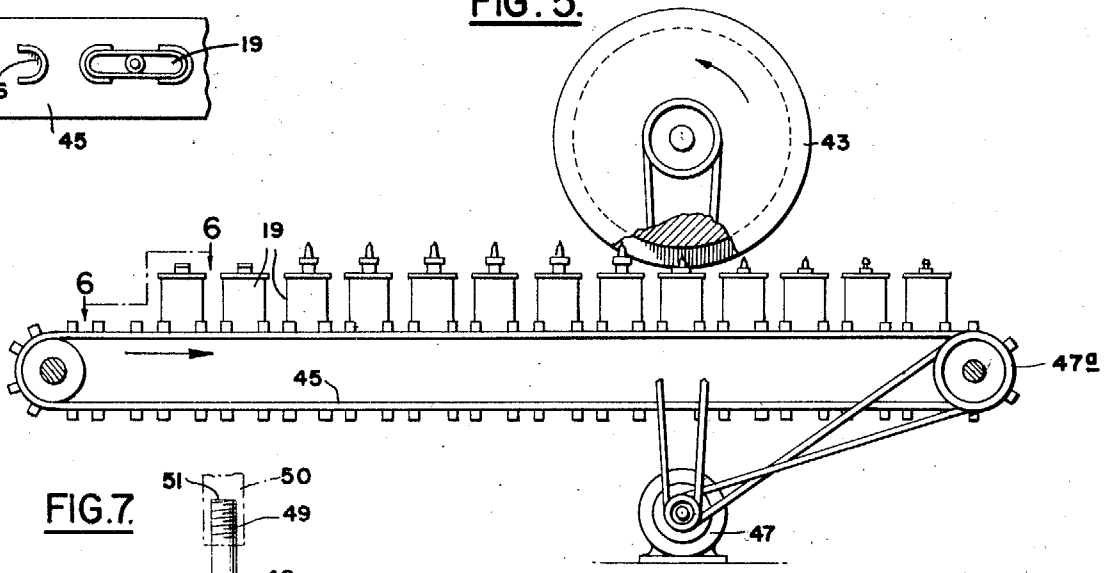
Fig. 5 shows schematically in elevation one mechanism for applying the new spout to the cans on a moving belt.
Figure 6:
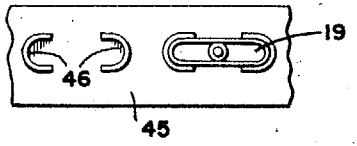
Fig. 6 is a fragmentary section taken on the line 6—6 of Fig. 5.

A simple method for applying the spout to cans is indicated in Fig. 5 which utilizes the split pulley shown in Fig. 3. As indicated at the left in Fig. 5 the cans are subjected to a split pulley press or corking wheel 43 comprising opposed rims 44 and 44a which by engaging the upper surface of base 22 of the spout press the latter downwardly in intimate sealing contact with the neck of the can. The cans are carried upon a link belt conveyor 45 having clamps 46 thereon for holding the cans in spaced relation. When electric motor 47 is actuated to drive the pulley 43 in a counter-clockwise direction and the link belt conveyor in a clockwise direction capping and sealing proceeds rapidly, it being only necessary that the operator repeatedly place cans in the clamps 46 at the left of corking wheel 43 and then place the plastic cap with the lengthened skirt upon the top of the neck of each can before it is advanced rightward to the corking wheel. As will be apparent in Figs. 3 and 4 the split pulley or corking wheel 43 does the rest. In Fig. 3 the spout rests upon the neck before receiving the pressure of the wheel. In Fig. 4 the spout is subject to the wheel which presses downwardly on the spout to cause sealing ring 39 to press outwardly over neck annulus 29 thereafter snapping into sealing position in groove 28 as shown in Fig. 2.

Figure 7:
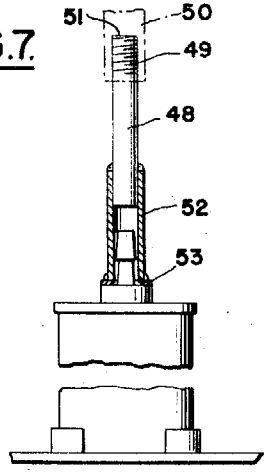
Fig. 7 is a schematic view showing adaptation of the present method to an arrangement similar to the conventional Callahan capper.
Figure 8:
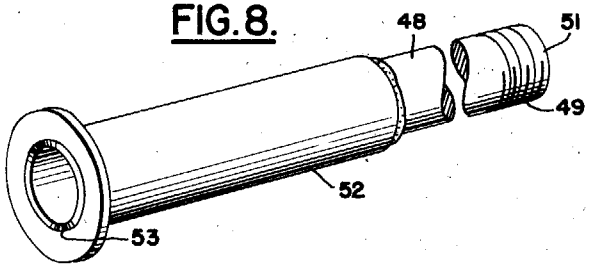
Fig. 8 is an enlarged view of the adapting tool shown in Fig. 7.

In another mechanism shown in Fig. 7 a convenient adaptor 48 is provided for use in the Callahan capper. By removing the conventional clincher head on the Callahan capper it is possible to use a piece of steel rod 48 threaded at 49 on its upper end 51 with corresponding SAE thread that will fit the Callahan capper fragmentarily shown at 50 in Fig. 7. A short piece of one-half inch inside diameter pipe 52 welded to this steel rod and then either flanged out slightly as shown at 53 or built up slightly with weld may be used, the flanging out being described to prevent cutting action when the capper head is depressed on the spout. When the spout is set lightly on the can and placed under the capper head, depressing the latter completes the seating action of the plastic spout which cooperates with the can neck as shown in Figs. 4 and 2.

Figure 10:
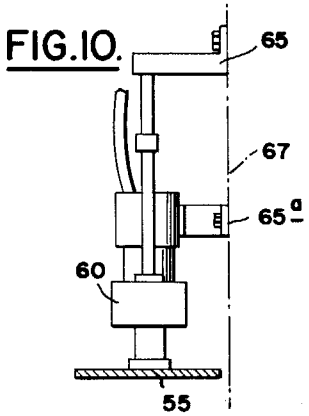
Fig. 10 is an end elevation of the mechanism shown in Fig. 9.
Figure 9:
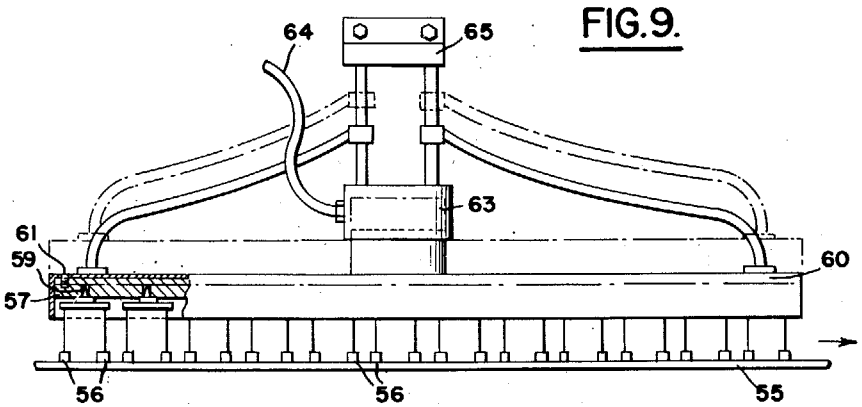
Fig. 9 is a schematic view in elevation showing method for attaching the plastic spout to a plurality of cans simultaneously.

Another mechanism by which the invention may be practiced is shown in Fig. 9 for filling multiple cans simultaneously, twelve being illustrated. The cans may be placed on a tray 55 having suitable frames 56 and the press provided with a two inch square steel 57 drilled large enough to accept one spout in each hole. The steel is provided with holes 59 and attached to head 60 by screws 61. The press 63 has hose 64 connecting to control mechanism (not shown). As shown in Fig. 10, suitable brackets 65 and 65a may be used to fix the press to any sturdy upright support or body 67.

Figure 12:
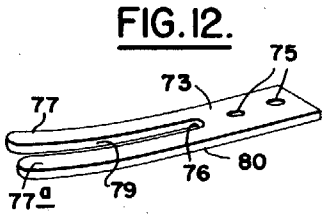
Fig. 12 is a perspective view of the pressure plate shown in Fig. 11.
Figure 11:
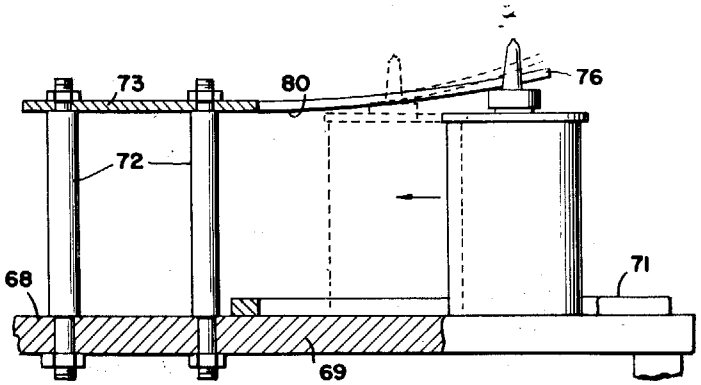
Fig. 11 is an enlarged detail showing another mechanism for applying the plastic spout to the can, this being designed primarily for individual manual operation.

A manual capper of simple design is shown in Figs. 11 and 12. This may be used for individual capping in sequence and is utilized manually. The manual capper comprises a base plate 69 having guide track 71 at one end and spaced support bolts 72—72 at the other end and spring plate 73. Plate 73 has at one end holes 75 for the spaced bolts and at the other end is bifurcated to provide parallel fingers 77 and 77a having space 79 therebetween through which the spout may be advanced. Fingers 77 and 77a are curved upwardly at 80, see Fig. 11 so that when the can with mounted spout is moved to the left with the spout between the fingers 77 and 77a, the curvature of the spring will depress the spout to cause its inner rings to engage the neck of the can in useful hermetical seal.

A preferred type of material for the plastic is polyethylene, commonly known in the trade as polythene and the cap is molded under a pressure of the order of 13,000 lbs. per square inch (gauge press of 600–700#) at a temperature of 100° F. The injection and gating may be done from the small end of the spout.

What is claimed is:

1. A plastic spout for liquid containers of the externally beaded neck type, comprising a tapered spout of plastic material terminating in a stretchable elongated skirt having an internal sealing means therein resiliently engageable with the beaded neck of a container, said spout including an integral internal ring member spaced inwardly from the elongated skirt and depending downwardly and extendible into the neck of a container for establishing through the flexibility of said internal ring member an inner seal for the inside of the said neck, an integral downwardly projecting internal ring member carried by said spout intermediate the stretchable elongated skirt and said aforementioned internal ring member for establishing contacting relation with the upper annular periphery of the neck of the container for forming a seal therewith, the said internal sealing means of said elongated skirt, and both of said internal ring members, having such spacing and resiliency that when said internal sealing means is moved into engagement over the beaded neck of the container said integral internal ring member and said integral downwardly projecting internal ring member are placed under tension with respect to the neck of said container whereby coacting liquid-tight seals are established between said spout and the beaded neck of the container.

2. A plastic spout for liquid containers of the externally beaded neck type as set forth in claim 1, in which the internal sealing means in said stretchable elongated skirt is constituted by an inwardly directed resilient ring member disposed on the inside wall of said elongated skirt and operative to establish connection with the beaded container neck.

3. A plastic spout for liquid containers of the externally beaded neck type as set forth in claim 1, in which the internal sealing means in said stretchable elongated skirt is constituted by a stretchable plastic bead adapted to establish sealing connection with the outside surface of the beaded container neck.

4. A plastic spout for liquid containers of the externally beaded neck type as set forth in claim 1, in which the internal sealing means in said stretchable elongated skirt is constituted by a resilient inwardly extending annular sealing ring formed from plastic material and terminating in annular offset relation to said first mentioned integral internal ring member for establishing sealing connection with the external surface of the beaded container neck.

5. A plastic spout for liquid containers of the externally beaded neck type as set forth in claim 1, in which the internal sealing means in said stretchable elongated skirt is constituted by an inwardly directed stretchable plastic bead annularly offset from both of said internal ring members for establishing connection with the outside surface of said beaded container neck.

6. A plastic spout for liquid containers of the externally beaded neck type as set forth in claim 1, in which the internal sealing means in said stretchable elongated skirt is constituted by an inwardly directed stretchable plastic sealing ring extending in a horizontal plane which extends beneath the lower extremity of said first mentioned integral internal ring member of said spout.

7. A plastic spout for liquid containers of the externally beaded neck type as set forth in claim 1, in which the internal sealing means in said stretchable elongated skirt is provided with a resilient inwardly directed annular rounded projection wherein the top of said annular rounded projection is connected through a curved surface with the inside of said spout in a position adjacent said second mentioned internal ring member and wherein the bottom of said annular rounded projection is connected through a curved surface with a straight wall forming the inside of said elongated skirt.

*8. A plastic dispensing device for liquid containers of the externally beaded neck type, comprising a spout of plastic material which defines a fluid passageway therein, a stretchable elongated skirt, said spout being connected to said stretchable elongated skirt, said skirt having an internal sealing bead therein lying in a plane substantially perpendicular to the longitudinal axis of the inside of the skirt and resiliently engageable with the beaded neck of a container, an integral internal ring member spaced inwardly from the elongated skirt and depending downwardly and extendible into the neck of a container for establishing an inner seal with said container neck, said ring member defining a permanently open fluid passageway in communication with said fluid passageway in the spout, said internal sealing bead of said elongated skirt and said internal ring member having such spacing and resiliency that when said internal sealing bead is moved into engagement over the beaded neck of the container said integral internal ring member and said bead respectively establish seals between said dispensing device and the neck of the container.*

*9. A plastic dispensing device for liquid containers of the externally beaded neck type as defined in claim 8, in which the skirt includes a peripheral portion that extends from the sealing bead in the direction away from said spout and is adapted to snugly engage the outside surface of the container neck below the bead on said neck.*

*10. A plastic dispensing device for liquid containers of the externally beaded neck type, comprising a spout of plastic material which defines a fluid passageway therein, said spout being connected to a stretchable elongated skirt having an internal sealing bead therein lying in a plane substantially perpendicular to the longitudinal axis of the inside of the skirt and resiliently engageable with the beaded neck of a container, said dispensing device including an integral downwardly extended internal annular ring member disposed between and spaced from both the stretchable elongated skirt and the spout fluid passageway for establishing a peripheral seal with the upper annular periphery of the neck of the container, said fluid passageway of the spout being in communication with the space surrounded by said internal annular member, said internal sealing bead of said elongated skirt and said projecting internal annular member having such spacing and resiliency that when said internal sealing bead is moved into engagement over the beaded neck of the container said internal sealing bead and said internal annular member respectively establish seals between said dispensing device and the neck of the container.*

*11. A plastic dispensing device for liquid containers of the externally beaded neck type as defined in claim 10, in which the skirt includes a peripheral portion that extends from the sealing bead in the direction away from said spout and is adapted to snugly engage the outside surface of the container neck below the bead on said neck.*

References Cited in the file of this patent or the original patent

UNITED STATES PATENTS

| | | |
|---|---|---|
| 1,478,035 | Hothesall | Dec. 18, 1923 |
| 1,540,435 | Tebo | June 2, 1925 |
| 1,681,829 | Wesseler | Aug. 21, 1928 |
| 1,869,049 | Card | July 26, 1932 |
| 2,098,128 | Bailey | Nov. 2, 1937 |
| 2,165,860 | Killmeyer | July 11, 1939 |
| 2,295,865 | Rentschler | Sept. 15, 1942 |
| 2,349,962 | Harris | May 30, 1944 |
| 2,497,708 | Wetherill | Feb. 14, 1950 |
| 2,571,542 | Collins | Oct. 16, 1951 |
| 2,577,321 | Filger | Dec. 4, 1951 |
| 2,601,039 | Livingstone | June 17, 1952 |
| 2,638,613 | Gunther | May 19, 1953 |